Patented Dec. 30, 1952

2,623,877

UNITED STATES PATENT OFFICE 2,623,877

SULFA DERIVATIVES OF 2-AMINO-5-CYCLO-ALKYL-1,3,4-THIADIAZOLES

Ferdinand B. Zienty, St. Louis, Mo., assignor to Monsanto Chemical Company, St. Louis, Mo., a corporation of Delaware No Drawing. Original application June 29, 1945, Serial No. 602,407. Divided and this application August 2, 1946, Serial No. 687,955

3 Claims. (Cl. 260—239.95)

This invention relates to substituted thiadiazoles and more particularly to certain 2-amino-5-cycloalkyl-1,3,4-thiadiazoles and their respective $N^4$-acetylsulfanilyl and 2-sulfanilyl derivatives. The compounds of the present invention have the following structural formula:

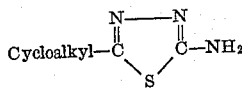

in which the cycloalkyl radical has from 3 to 6 carbon atoms in the ring structure. The 2-amino-5-cycloalkyl-1,3,4-thiadiazoles of the present invention may be found useful for their analgesic properties and are also useful in the preparation of other types of therapeutic and pharmaceutic agents. The sufanilyl derivatives of the 2-amino-5-cycloalkyl - 1,3,4 - thiadiazoles of the present invention process have marked activity in the control of bacterial growth. The salts of the respective compounds employed are also contemplated as being within the scope of this invention.

The following 5-cycloalkyl derivatives of 2-amino-1,3,4-thiadiazole are illustrative of the novel compounds of the present invention: cyclopropyl, cyclobutyl, cyclopentyl and cyclohexyl.

The 2-amino-5-cycloalkyl-1,3,4-thiadiazoles of the present invention may be prepared by any desired procedure. One procedure found useful is that which involves condensation of the appropriate cycloalkyl carbonyl chloride with thiosemicarbazide, the solution of the resulting product in water and the subsequent recovery of the product by precipitation on alkalinizing the solution. The $N^4$-acetylsulfanilyl derivatives of substituted thiadiazoles of the present invention may be prepared by reacting N-acetylsulfanilyl chloride with the appropriate 2-amino-5-cycloalkyl-1,3,4-thiadiazole. Other acyl residues may be present on the sulfanilyl residue in place of the acetyl residue, for example, formyl, propionyl or butyryl residues. The sulfanilamido derivative may be prepared therefrom by hydrolysis of the appropriate acyl derivative in alkaline solution. The sulfanilamido derivative may be prepared also by reduction of the 2-(p-nitrobenzenesulfonamido)-5-cycloalkyl-1,3,4-thiadiazoles. The latter compounds may be prepared by reaction of p-nitrobenzenesulfonyl chloride with the appropriate 2-amino-5-cycloalkyl-1,3,4-thiadiazole.

The following examples will serve to illustrate suitable procedures for preparing the novel compounds of the present invention:

EXAMPLE I

2-amino-5-cyclopropyl-1,3,4-thiadiazole

To 2.1 g. (0.02 mole) of cyclopropyl carbonyl chloride was added 1.8 g. (0.02 mole) of thiosemicarbazide. The mixture was warmed on a water bath to a temperature of approximately 75° C. at which point hydrogen chloride was evolved and the mixture became partly liquefied. After the evolution of gas had ceased, the mixture was cooled and 10 cc. of water was added with agitation. The white solid which formed was 2-amino-5-cyclopropyl-1,3,4-thiadiazole hydrochloride. A small portion of this material was removed from the mixture, washed and dried and a melting point was obtained; M. P. 113–116° C. (Corr.); weight 0.4 g. (equivalent to 0.32 g. of the free base compound). Upon the addition of 40 cc. of water to the mixture, the hydrochloride salt dissolved. The solution was filtered and a sufficient quantity of 25% sodium hydroxide was added to precipitate the free base compound, 2-amino-5-cyclopropyl - 1,3,4 - thiadiazole. The resulting slurry was cooled below 20° C. and the crystalline precipitate was filtered off, washed with water, dried in air and finally dried in an oven at 85° C. Melting point 210–211° C. (Corr.).

EXAMPLE II

2-($N^4$-acetylsulfanilamido)-5-cyclopropyl-1,3,4-thiadiazole

A solution of 0.7 g. (0.005 mole) of 2-amino-5-cyclopropyl-1,3,4-thiadiazole in 20 cc. of anhydrous pyridine was prepared. The solution was cooled to 10° C. To the solution was added 1.6 g. of N-acetylsulfanilyl chloride. When all of the materials were in solution the temperature was raised to 25° C. and maintained at that point for 30 minutes. Following this the temperature was raised to 75° C. and maintained at that point for one hour with agitation. Approximately 50 cc. of water were added and the resulting mixture was distilled to remove the pyridine therefrom. A pale yellow solid precipitated in the residual solution in the flask. This precipitate was filtered off, washed with water and dried at 100° C. The product was 2-($N^4$-acetylsulfanilamido)-5-cyclopropyl-1,3,4-thiadiazole. Melting point 239–240° C. (Corr.).

EXAMPLE III

2-sulfanilamido-5-cyclopropyl-1,3,4-thiadiazole

A mixture of 0.68 g. (0.002 mole) of 2-($N^4$-acetylsulfanilamido)-5-cyclopropyl - 1,3,4 - thiadiazole in 2.5 cc. of water containing 0.48 g.

(0.006 mole) of 50% sodium hydroxide solution was prepared and refluxed for three hours. After this time the mixture was cooled and filtered. The filter was washed with a small quantity of water. To the filtrate was added 10% hydrochloric acid until the solution was neutral to litmus, whereupon a precipitate was formed in the solution. The solid product was filtered off, washed with water and dried at 100° C. The product was 2-sulfanilamido-5-cyclopropyl-1,3,4-thiadiazole. The yield of product was quantitative. Melting point 220–221° C. (Corr.). The material was crystallized from 18 cc. of ethyl alcohol and again crystallized from 13 cc. of ethyl alcohol. Melting point 222–223° C. (Corr.).

EXAMPLE IV

2-amino-5-cyclobutyl-1,3,4-thiadiazole

To 0.20 mole of cyclobutyl carbonyl chloride was added 0.20 mole of thiosemicarbazide. The mixture was heated to approximately 75° C. and maintained at that temperature until the evolution of hydrogen chloride had ceased. The solid material was dissolved in 500 cc. of water and sufficient 25% sodium hydroxide solution was added to render the mixture alkaline. The solid material which precipitated in the solution was filtered off, washed with water and dried. This material was 2-amino-5-cyclobutyl-1,3,4-thiadiazole.

EXAMPLE V

2-($N^4$-acetylsulfanilamido)-5-cyclobutyl-1,3,4-thiadiazole

A solution of 0.05 mole of 2-amino-5-cyclobutyl-1,3,4-thiadiazole in 25 cc. of pyridine was prepared. The resulting solution was cooled to 10° C. To this solution was added N-acetylsulfanilyl chloride in 35% excess. The mixture was stirred for 30 minutes at 25° C. and for one hour at 75° C. Approximately 50 cc. of water was added and the mixture was distilled to remove pyridine. The material which separated from the solution was filtered off, washed with water and dried. This material was 2-($N^4$-acetylsulfanilamido)-5-cyclobutyl-1,3,4-thiadiazole.

EXAMPLE VI

2-sulfanilamido-5-cyclobutyl-1,3,4-thiadiazole

A mixture of 0.02 mole of 2-($N^4$-acetylsulfanilamido)-5-cyclobutyl-1,3,4-thiadiazole, 0.06 mole of sodium hydroxide (50% aqueous solution) and 5 cc. of water was prepared and refluxed for 3 hours. Following this the mixture was cooled, filtered and treated with 10% hydrochloric acid until neutral to litmus. The solid product was washed with water and dried. The material was 2-sulfanilamido-5-cyclobutyl-1,3,4-thiadiazole.

EXAMPLE VII

2-amino-5-cyclopentyl-1,3,4-thiadiazole

To 0.02 mole of cyclopentyl carbonyl chloride was added 0.02 mole of thiosemicarbazide. The mixture was heated at 75° C. until the evolution of hydrogen chloride had ceased. Approximately 50 cc. of water was added to the mixture and the resulting solution was filtered. To the filtrate was added sufficient sodium hydroxide solution to render the solution alkaline. A precipitate was formed in the solution. The resulting slurry was cooled below 20° C. and filtered. The solid material was washed with water and dried. The product was 2-amino-5-cyclopentyl-1,3,4-thiadiazole.

EXAMPLE VIII

2-($N^4$-acetylsulfanilamido)-5-cyclopentyl-1,3,4-thiadiazole

A solution of 0.005 mole of 2-amino-5-cyclopentyl-1,3,4-thiadiazole in 25 cc. of pyridine was prepared and cooled to 10° C. To the solution was added $N^4$-acetylsulfanilyl chloride in 35% excess. The mixture was agitated for 30 minutes at 25° C. and subsequently for one hour at 75° C. Approximately 30 cc. of water was added and the mixture was distilled to remove pyridine. The precipitate which formed in the residual solution was filtered off, washed with water and dried. The product was 2-($N^4$-acetylsulfanilamido)-5-cyclopentyl-1,3,4-thiadiazole.

EXAMPLE IX

2-sulfanilamido-5-cyclopentyl-1,3,4-thiadiazole

A mixture of 0.002 mole of 2-($N^4$-acetylsulfanilamido)-5-cyclopentyl-1,3,4-thiadiazole, 0.006 mole of sodium hydroxide (50% aqueous solution) and 5 cc. of water was refluxed for 3 hours. The mixture was then cooled and filtered and the filtrate was rendered neutral with 10% hydrochloric acid. The precipitate which formed was filtered off, washed with water and dried. The product was 2-sulfanilamido-5-cyclopentyl-1,3,4-thiadiazole.

EXAMPLE X

2-amino-5-cyclohexyl-1,3,4-thiadiazole

To 0.02 mole of cyclohexyl carbonyl chloride was added 0.02 mole of thiosemicarbazide. The mixture was heated at 75° C. until the evolution of hydrogen chloride had ceased. Approximately 50 cc. of water was added to the mixture and the solid product was dissolved therein. The resulting solution was filtered. The filtrate was rendered alkaline with 25% sodium hydroxide solution. A precipitate formed in the solution. The resulting slurry was cooled below 20° C. and filtered. The solid material was washed with water and dried. The product was 2-amino-5-cyclohexyl-1,3,4-thiadiazole.

EXAMPLE XI

2-($N^4$-acetylsulfanilamido)-5-cyclohexyl-1,3,4-thiadiazole

A solution of 0.005 mole of 2-amino-5-cyclohexyl-1,3,4-thiadiazole in 30 cc. of pyridine was prepared. The solution was cooled to 10° C. To this solution was added N-acetylsulfanilyl chloride in 35% excess. The resulting mixture was stirred for 30 minutes at 25° C. and thereafter for one hour at 75° C. Approximately 25 cc. of water was added and the mixture was distilled to remove pyridine. The solid material which precipitated in the residual solution was filtered off, washed with water and dried. The resulting product was 2-($N^4$-acetylsulfanilamido)-5-cyclohexyl-1,3,4-thiadiazole.

EXAMPLE XII

2-sulfanilamido-5-cyclohexyl-1,3,4-thiadiazole

A mixture of 0.002 mole of 2-($N^4$-acetylsulfanilamido)-5-cyclohexyl-1,3,4-thiadiazole, 0.006 mole of sodium hydroxide (50% aqueous solution) and 5 cc. of water was prepared and refluxed for 3 hours. The resulting mixture was cooled and filtered. The filtrate was treated with 10% hydrochloric acid until neutral. The precipitate which formed in the solution was filtered off, washed with water and dried. The product was 2-sulfanilamido-5-cyclohexyl-1,3,4-thiadiazole.

The 2-amino-5-cycloalkyl-1,3,4-thiadiazoles of the present invention may also be employed in the form of the acid salt derivatives, such as the hydrochloride, sulfate, benzoate or acetate. These salt derivatives are readily prepared by reacting in equimolecular proportions the 2-amino-5-cycloalkyl-1,3,4-thiadiazole with the appropriate acid in aqueous or organic solvent solution, according to procedures known in this art for the preparation of acid salt derivatives of basic organic nitrogen compounds.

The novel compounds of the present invention may be compounded with other substances to produce tablets or ointment. For example, the 2-amino-5-cycloalkyl-1,3,4-thiadiazoles or the 2-sulfanilamido-5-cycloalkyl-1,3,4-thiadiazoles may be blended with a binding agent such as a mixture of starch and lactose and an excipient in suitable proportions and the mixture may then be pressed into tablets for oral administration. Likewise, the compounds of the present invention may be blended with lanolin, a mixture of lanolin and cold cream, petrolatum or other unctuous bodies with or without other components to form an ointment for external application to infected areas. In place of an oily ointment, an aqueous paste for external application may be prepared by compounding the compounds of the present invention with propylene glycol, cetyl alcohol, white wax, sodium lauryl sulfate and water, or with a soap-like preparation made by reacting triethanolamine with stearic acid in the presence of cetyl alcohol, cocoa butter, sodium lauryl sulfonate and water.

The present application is a division of my co-pending application Serial Number 602,407, filed June 29, 1945.

While the compounds of the present invention have been described in the foregoing specification and examples, it is to be observed that the present invention is not to be construed as being limited in respect to any particular substances, proportions, conditions or combinations except as defined in the claims.

I claim:
1. A compound from the group consisting of 2-sulfanilamido-5-cyclopropyl-1,3,4-thiadiazole and salts thereof.
2. 2-sulfanilamido-5-cyclopropyl-1,3,4-thiadiazole.
3. A salt of 2-sulfanilamido-5-cyclopropyl-1,3,4-thiadiazole.

FERDINAND B. ZIENTY.

REFERENCES CITED

The following references are of record in the file of this patent:

UNITED STATES PATENTS

| Number | Name | Date |
|---|---|---|
| 2,358,031 | Roblin et al. | Sept. 12, 1944 |